United States Patent
Jiang et al.

(10) Patent No.: US 11,106,561 B2
(45) Date of Patent: Aug. 31, 2021

(54) METHOD AND DEVICE FOR EVALUATING IO PERFORMANCE OF CACHE SERVERS

(71) Applicant: WANGSU SCIENCE & TECHNOLOGY CO., LTD., Shanghai (CN)

(72) Inventors: Yue Jiang, Shanghai (CN); Xu Zhang, Shanghai (CN); Yajuan Zheng, Shanghai (CN); Xiaowei Chen, Shanghai (CN); Wei Lei, Shanghai (CN); Zhihuai Pan, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 371 days.

(21) Appl. No.: 16/348,044

(22) PCT Filed: Aug. 22, 2018

(86) PCT No.: PCT/CN2018/101750
§ 371 (c)(1),
(2) Date: May 7, 2019

(87) PCT Pub. No.: WO2020/029328
PCT Pub. Date: Feb. 13, 2020

(65) Prior Publication Data
US 2020/0264964 A1    Aug. 20, 2020

(30) Foreign Application Priority Data

Aug. 9, 2018 (CN) .......................... 201810905036.2

(51) Int. Cl.
*G06F 11/30* (2006.01)
*G06F 11/34* (2006.01)
*H04L 29/08* (2006.01)

(52) U.S. Cl.
CPC ...... *G06F 11/3433* (2013.01); *G06F 11/3041* (2013.01); *G06F 11/3452* (2013.01); *H04L 67/2842* (2013.01)

(58) Field of Classification Search
CPC .................................................... G06F 11/3433
(Continued)

(56) References Cited

U.S. PATENT DOCUMENTS

2007/0239398 A1* 10/2007 Song ................. G06F 1/3203
702/186
2012/0054265 A1   3/2012 Kazerani et al.
(Continued)

FOREIGN PATENT DOCUMENTS

| CN | 101197876 A | 6/2008 |
| CN | 102801550 A | 11/2012 |

(Continued)

OTHER PUBLICATIONS

The China National Intelleectual Property Administration (CNIPA) The China Search Report for 201810905036.2 dated Dec. 17, 2019 5 Pages.

(Continued)

*Primary Examiner* — Timothy A Mudrick (57) ABSTRACT

A method for evaluating IO performance of cache servers includes: collecting basic data of all to-be-evaluated cache servers, where the basic data includes at least service data, disk configuration, load data, and performance data; filtering the basic data of all the to-be-evaluated cache servers, and classifying cache servers whose basic data have the same data characteristics into one category; statistically analyzing basic data of cache servers of each category, to obtain evaluation indexes for the cache servers of each category; and determining, according to the evaluation indexes for the cache servers of each category, disk IO configuration (Continued)

requirements for the cache servers of each category, where the disk IO configuration requirements include at least a disk capacity configuration requirement and a disk load algorithm configuration requirement.

14 Claims, 2 Drawing Sheets

(58) Field of Classification Search
USPC .......................................................... 702/186
See application file for complete search history.

(56) References Cited

U.S. PATENT DOCUMENTS

| | | | |
|---|---|---|---|
| 2013/0326051 A1* | 12/2013 | LeGendre | G06F 11/3428 709/224 |
| 2016/0041948 A1* | 2/2016 | Vichare | G06F 11/3452 702/181 |
| 2016/0092363 A1* | 3/2016 | Wang | G06F 1/3206 711/119 |
| 2016/0378545 A1* | 12/2016 | Ho | G06F 9/46 718/107 |
| 2017/0090779 A1* | 3/2017 | Barzik | G06F 3/0653 |
| 2017/0308492 A1 | 10/2017 | Vajravel et al. | |
| 2018/0123931 A1* | 5/2018 | Sun | H04L 43/16 |

FOREIGN PATENT DOCUMENTS

| | | |
|---|---|---|
| CN | 104252411 A | 12/2014 |
| CN | 104270371 A | 1/2015 |
| CN | 105786681 A | 7/2016 |
| CN | 105912454 A | 8/2016 |
| CN | 106445759 A | 2/2017 |
| CN | 107659595 A | 2/2018 |
| CN | 107797847 A | 3/2018 |

OTHER PUBLICATIONS

The European Patent Office (EPO) The Extended European Search Report for 18893319.6 dated Jan. 13, 2021 10 Pages.

* cited by examiner

METHOD AND DEVICE FOR EVALUATING IO PERFORMANCE OF CACHE SERVERS

CROSS-REFERENCES TO RELATED APPLICATIONS

This application is a national phase entry under 35 U.S.C § 371 of International Application No. PCT/CN2018/101750 filed on Aug. 22, 2018, which claims priority of Chinese Patent Application No. 2018109050362, filed with the State Intellectual Property Office of P. R. China on Aug. 9, 2018, the entire contents of all of which are incorporated herein by reference.

FIELD OF DISCLOSURE

The present disclosure generally relates to the field of content delivery network technology and, more particularly, relates to a method and device for evaluating IO performance of cache servers.

BACKGROUND

Service providers provide services, such as web browsing and video streaming, to users through CDN systems. The services may be implemented through multiple cache servers working together in a CDN system. The cache servers may locally cache data resources provided by the service source stations. When users want to acquire these data resources, the corresponding data resources may be obtained directly from the cache servers, without requiring to access the service source stations.

In the process of providing services to users, a cache server relies on a large number of disks to cache the data resources. Disk IO performance thus becomes the key point that limits the user access speed. Nonetheless, excessive disk IO resources will also increase the equipment cost of a cache server. Therefore, to reduce the cost and improve user access efficiency, the disk IO performance of a cache server may be evaluated and further adjusted based on the evaluation result. During the evaluation process, a specialized disk IO performance evaluation program is generally used to test a to-be-evaluated cache server, to determine whether the disk IO performance of the cache server meets the service requirements. If the service requirements are not met, the disk IO configuration of the cache server is then adjusted.

In the process of implementing the present disclosure, the applicants have found that the existing technologies have at least the following problems:

When testing a cache server using the disk IO performance evaluation programs, the test result is easily affected by a large number of factors, such as the current service status, network status, and device status. For instance, events such as really light access traffic by the current users, network fluctuations at the moment of testing, or short-term failure(s) of hardware devices may all change the test result to some extent. Accordingly, by using the above test result, the disk IO configuration of the cache server may not be accurately adjusted.

BRIEF SUMMARY OF THE DISCLOSURE

To solve the problems in the existing technologies, the embodiments of the present disclosure provide a method and device for evaluating IO performance of cache servers. The technical solutions are as follows:

In one aspect, a method for evaluating IO performance of cache servers is provided. The method includes:
collecting basic data of all to-be-evaluated cache servers, where the basic data includes at least service data, disk configuration, load data, and performance data;
filtering the basic data of all the to-be-evaluated cache servers, and classifying cache servers whose basic data have the same data characteristics into one category;
statistically analyzing basic data of cache servers of each category, to obtain evaluation indexes for the cache servers of each category; and
determining, according to the evaluation indexes for the cache servers of each category, disk IO configuration requirements for the cache servers of each category, where the disk IO configuration requirements include at least a disk capacity configuration requirement and a disk load algorithm configuration requirement.

Further, collecting the basic data of all the to-be-evaluated cache servers includes:
acquiring disk configuration and service data of each cache server from all the to-be-evaluated cache servers;
determining, according to the service data, a moment with the heaviest traffic, for a cache server, corresponding to the service data; and
determining load data and performance data of the cache server for the moment with the heaviest traffic.

Further, filtering the basic data of all the to-be-evaluated cache servers, and classifying cache servers whose basic data have the same data characteristics into one category includes:
determining, according to the service data, a service traffic range, an evaluation time range, and a corresponding service type for each to-be-evaluated cache server; and
classifying all the to-be-evaluated cache servers based on the service traffic range, the evaluation time range, the service type, and disk configuration of each to-be-evaluated cache server.

Further, statistically analyzing the basic data of cache servers of each category, to obtain the evaluation indexes for the cache servers of each category includes:
for the cache servers of each category, acquiring load data and performance data of all cache servers under a current category; and
calculating corresponding means, peak values, and distributions of the load data and the performance data as evaluation indexes for the cache servers of the current category, where the evaluation indexes include at least a load evaluation index and a performance evaluation index, and the performance evaluation index includes at least a disk capacity evaluation index and a disk load algorithm evaluation index.

Further, determining, according to the evaluation indexes for the cache servers of each category, the disk IO configuration requirements for the cache servers of each category includes:
determining, according to the load evaluation index and the disk capacity evaluation index, the disk capacity configuration requirement for the cache servers of the current category, where the disk capacity configuration requirement includes at least: capacity to-be-expanded, capacity to-be-reduced, and no capacity change; and
determining, according to the disk load algorithm evaluation index, the disk load algorithm configuration requirement for the cache servers of the current category, where the disk load algorithm configuration requirement includes at least: adjusting an algorithm and maintaining the algorithm.

Further, determining, according to the load evaluation index and the disk capacity evaluation index, the disk capacity configuration requirement for the cache servers of the current category includes:

determining, according to the load evaluation index, a load characteristic of the cache servers of the current category, and determining, according to the disk capacity evaluation index, a disk capacity characteristic of the cache servers of the current category;

if the load characteristic is: saturated, determining that the disk capacity configuration requirement for the cache servers of the current category is: capacity to-be-expanded;

if the load characteristic is: unsaturated and the disk capacity characteristic is: excessive, determining that the disk capacity configuration requirement for the cache servers of the current category is: capacity to-be-reduced; and if the load characteristic is: unsaturated and the disk capacity characteristic is: not excessive, determining that the disk capacity configuration requirement for the cache servers of the current category is: no capacity change.

Further, determining, according to the disk load algorithm evaluation index, the disk load algorithm configuration requirement for the cache servers of the current category includes:

determining, according to the disk load algorithm evaluation index, a proportion of cache servers, among all the cache servers under the current category, whose multi-disk balancing degrees are at a low level;

if the proportion of cache servers, whose multi-disk balancing degrees are at a low level, is less than or equal to a threshold, determining that the disk load algorithm configuration requirement for the cache servers of the current category is: maintaining the algorithm; and if the proportion of cache servers, whose multi-disk balancing degrees are at a low level, is greater than the threshold, determining that the disk load algorithm configuration requirement for the cache servers of the current category is: adjusting the algorithm.

In another aspect, a device for evaluating IO performance of cache servers is provided. The device includes:

a collection module that is configured to collect basic data of all to-be-evaluated cache servers, where the basic data includes at least service data, disk configuration, load data, and performance data;

a classification module that is configured to filter the basic data of all the to-be-evaluated cache servers, and classify cache servers whose basic data have the same data characteristics into one category;

a calculation module that is configured to statistically analyze basic data of cache servers of each category, to obtain evaluation indexes for the cache servers of each category; and an evaluation module that is configured to determine, according to the evaluation indexes for the cache servers of each category, disk IO configuration requirements for the cache servers of each category, where the disk IO configuration requirements include at least a disk capacity configuration requirement and a disk load algorithm configuration requirement.

Further, the collection module is specifically configured to:

acquire disk configuration and service data of each cache server from all the to-be-evaluated cache servers;

determine, according to the service data, a moment with the heaviest traffic, for a cache server, corresponding to the service data; and determine load data and performance data of the cache server for the moment with the heaviest traffic.

Further, the classification module is specifically configured to:

determine, according to the service data, a service traffic range, an evaluation time range, and a corresponding service type for each to-be-evaluated cache server; and classify all the to-be-evaluated cache servers based on the service traffic range, the evaluation time range, the service type, and disk configuration of each to-be-evaluated cache server.

Further, the calculation module is specifically configured to:

for the cache servers of each category, acquire load data and performance data of all cache servers under a current category; and calculate corresponding means, peak values, and distributions of the load data and the performance data as evaluation indexes for the cache servers of the current category, where the evaluation indexes include at least a load evaluation index and a performance evaluation index, and the performance evaluation index includes at least a disk capacity evaluation index and a disk load algorithm evaluation index.

Further, the evaluation module is specifically configured to:

determine, according to the load evaluation index and the disk capacity evaluation index, the disk capacity configuration requirement for the cache servers of the current category, where the disk capacity configuration requirement includes at least: capacity to-be-expanded, capacity to-be-reduced, and no capacity change; and determine, according to the disk load algorithm evaluation index, the disk load algorithm configuration requirement for the cache servers of the current category, where the disk load algorithm configuration requirement includes at least: adjusting an algorithm and maintaining the algorithm.

Further, the evaluation module is specifically configured to:

determine, according to the load evaluation index, a load characteristic of the cache servers of the current category, and determine, according to the disk capacity evaluation index, a disk capacity characteristic of the cache servers of the current category;

if the load characteristic is: saturated, determine that the disk capacity configuration requirement for the cache servers of the current category is: capacity to-be-expanded;

if the load characteristic is: unsaturated and the disk capacity characteristic is: excessive, determine that the disk capacity configuration requirement for the cache servers of the current category is: capacity to-be-reduced; and if the load characteristic is: unsaturated and the disk capacity characteristic is: not excessive, determine that the disk capacity configuration requirement for the cache servers of the current category is: no capacity change.

Further, the evaluation module is specifically configured to:

determine, according to the disk load algorithm evaluation index, a proportion of cache servers, among all the cache servers under the current category, whose multi-disk balancing degrees are at a low level;

if the proportion of cache servers, whose multi-disk balancing degrees are at a low level, is less than or equal to a threshold, determine that the disk load algorithm configuration requirement for the cache servers of the current category is: maintaining the algorithm; and if the proportion of cache servers, whose multi-disk balancing degrees are at a low level, is greater than the threshold, determine that the disk load algorithm configuration requirement for the cache servers of the current category is: adjusting the algorithm.

The beneficial effects brought by the technical solutions provided by the embodiments of the present disclosure include:

In the embodiments of the present disclosure, basic data of all to-be-evaluated cache servers are collected, where the basic data includes at least service data, disk configuration, load data, and performance data; the basic data is filtered, and cache servers whose basic data have the same data characteristics are classified into one category; the basic data of cache servers of each category is statistically analyzed, to obtain evaluation indexes for the cache servers of each category; according to the evaluation indexes for the cache servers of each category, the disk IO configuration requirements for the cache servers of each category are determined, where the disk IO configuration requirements include at least a disk capacity configuration requirement and a disk load algorithm configuration requirement. In this way, cache servers with the same data characteristics are classified into one category, and all cache servers that have the same type of CDN services with the similar load characteristics and performance characteristics may be evaluated as a whole. Without direct use of the basic data for evaluation, the impact of abnormal data on the evaluation result during the evaluation process may be reduced, which may not only improve the accuracy of the evaluation result, but also allow the evaluation to be conducted for different CDN services.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the implementations of the present disclosure will be made in detail hereinafter with reference to the accompanying drawings.

The embodiments of the present disclosure provide a method for evaluating IO performance of cache servers. The method may be applied to an evaluation device in a CDN system. The evaluation device may be an evaluation server or other evaluation devices. Cache servers in a CDN system store files such as videos, audios, text, and images to provide users with various types of services. Cache servers of the same service type generally have similar IO characteristics. Accordingly, cache servers under a same CDN cluster may be classified according to the IO characteristics. The IO performance evaluation may be then conducted concurrently for the same type of cache servers. One application scenario of the disclosed embodiments may include: collecting data from all to-be-evaluated cache servers; classifying all the to-be-evaluated cache servers according to the collected data; for cache servers of each category, obtaining evaluation indexes for the cache servers according to the previously collected data; and generalizing a load characteristic and a performance characteristic of the cache servers of each category by using the evaluation indexes, so as to determine the disk IO configuration requirements for the cache servers. The evaluation method of the present disclosure may consider the IO performance requirements as a whole from the service type aspect when the cache servers provide the same type of service, which is beneficial to the uniform adjustment of cache servers that provide the same application service, thereby facilitating the management and operation.

Figure 1:
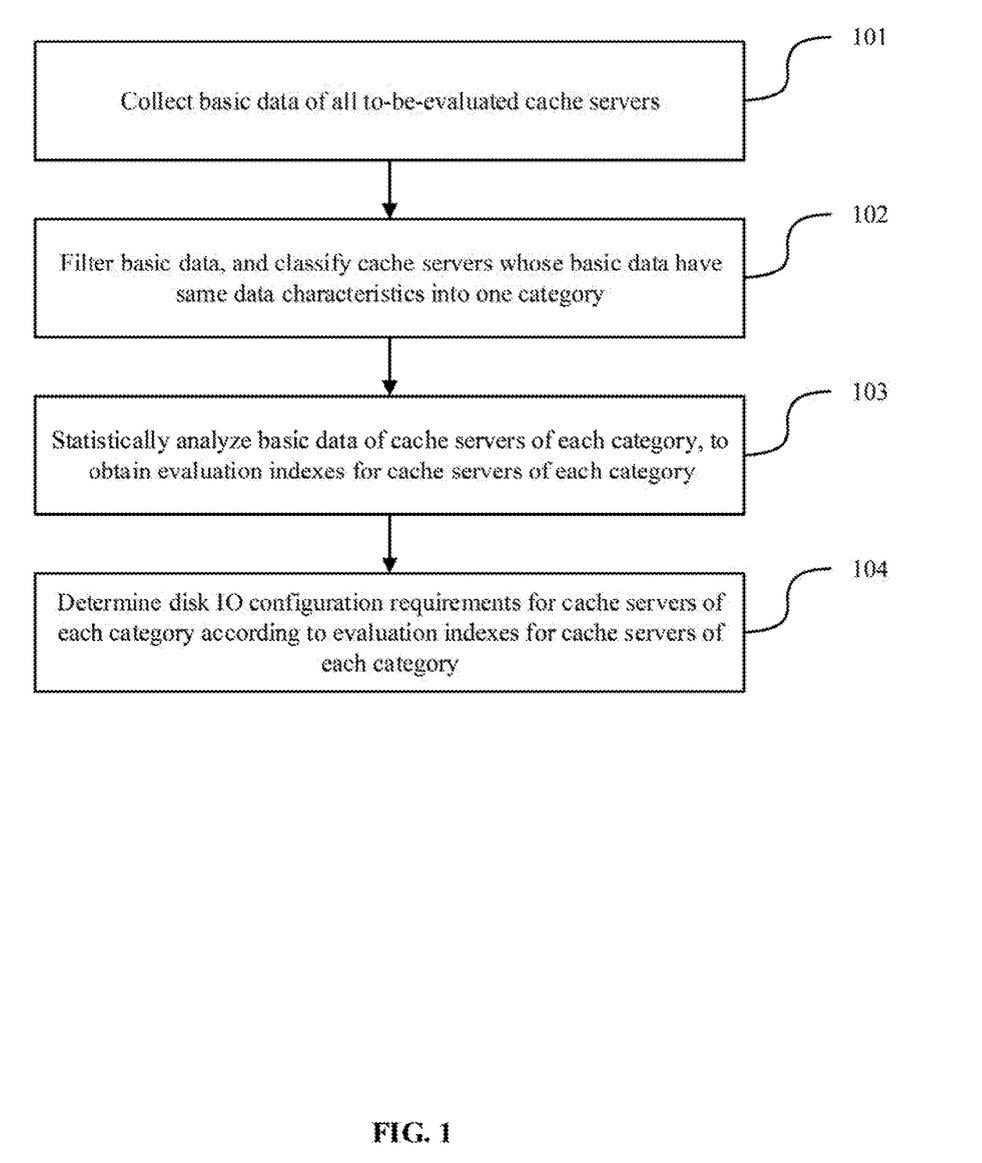
FIG. 1 is a flowchart of a method for evaluating IO performance of cache servers according to some embodiments of the present disclosure.

A flowchart for evaluating the IO performance of cache servers shown in FIG. 1 will be made in detail hereinafter with reference to specific implementations. The content may be as follows:

Step 101: Collect basic data of all to-be-evaluated cache servers.

Here, the basic data includes at least service data, disk configuration, load data, and performance data.

In one implementation, when evaluating the IO performance of cache servers, the evaluation device in a CDN system first determines all cache servers that need to be evaluated, and then respectively acquires the disk configuration of each to-be-evaluated cache server, and collects service data, load data, and performance data from the respective log file of each to-be-evaluated cache server. Here, the service data may include service type, channel bandwidth, the number of requests, and the like for the service(s) provided by a cache server; the disk configuration may include disk type (e.g., STAT, IDE, SCSI, SAS), the number of disks, and the like; the load data may include IOPS (Input/Output Operations Per Second), IO throughput, IO queue length, and the like; while the performance data may include IO delay, disk load, IO waiting time, and the like.

Optionally, the load pressure and resource consumption of a cache server are proportional to the oscillation of the traffic. Generally, when the traffic is the heaviest, the load pressure is the highest, the resource consumption is the largest, and the IO performance requirement of a cache server is the highest. Accordingly, the process of Step 101 may be specifically as follows: acquiring disk configuration and service data of each cache server from all the to-be-evaluated cache servers; determining, according to the service data, a moment with the heaviest traffic, for a cache server, corresponding to the service data; and determining load data and performance data of the cache server for the moment with the heaviest traffic.

In one implementation, for any of the to-be-evaluated cache servers, the evaluation device first acquires the disk configuration of the cache server, acquires the service data of the cache server from the log file of the cache server, determines the moment with the heaviest traffic for the cache server according to the channel bandwidth and the number of requests in the service data, and then determines, from the log file, the load data and the performance data of the cache server for the moment with the heaviest traffic. For all the to-be-evaluated cache servers, the evaluation device adopts the above processing method to obtain the respective service data, disk configuration, and load data and performance data for the moment with the heaviest traffic one by one for each to-be-evaluated cache server. Generally, a cache server collects instant service data, load data, and performance data every minute and records the collected data in the log file. During the evaluation process, since the disk configuration of a cache server does not change frequently, the disk configuration of the cache server only needs to be collected once at the beginning of the evaluation. Afterwards, through the log file of the cache server, the service data at each minute may be acquired. Based on the service data at each minute, the specific time for the moment with the heaviest traffic may be determined. Eventually, based on the specific time for the moment with the heaviest traffic, the corresponding load data and performance data may be obtained from the log file.

Step 102: Filter the basic data of all the to-be-evaluated cache servers, and classify cache servers whose basic data have the same data characteristics into one category.

In one implementation, after acquiring the service data, disk configuration, load data, and performance data of each to-be-evaluated cache server, the evaluation device filters out, from all the to-be-evaluated cache servers, cache servers whose basic data have the same data characteristics, and classifies these cache servers into one category. This helps to prevent the basic data with different data characteristics from interfering each other in the later analysis, which affects the evaluation result.

Optionally, the disk load and performance of a cache server are relevant to the service traffic, evaluation time, service type, and disk configuration. Accordingly, the process of Step 102 may be specifically as follows: determining, according to the service data, a service traffic range, an evaluation time range, and a corresponding service type of each to-be-evaluated cache server; and classifying all the to-be-evaluated cache servers based on the service traffic range, the evaluation time range, the service type, and the disk configuration of each to-be-evaluated cache server.

In one implementation, after obtaining the respective service data, disk configuration, and load data and performance data for the moment with the heaviest traffic for each to-be-evaluated cache device, the evaluation device further determines the service traffic range, the evaluation time range, and the service type of that cache server based on the respective service data of each to-be-evaluated cache server. Thereafter, by using the service traffic range, the evaluation time range, the service type, and the disk configuration as the filtering criteria, the to-be-evaluated cache servers may be then classified. Generally, the to-be-evaluated cache servers having the same or similar service traffic ranges, evaluation time ranges, and service types, and at the same time having the same disk configuration are classified into the same category. Cache servers of different service types have different service traffic ranges. The larger the service traffic, the heavier the load of a cache server, and the greater the resource consumption. Cache servers with the same load may have different performance due to the different disk configurations on these cache servers. Therefore, the above-described classification method may classify cache servers that have the approximate loads and have the same disk configuration into the one group, which is beneficial to the inductive calculation of the load data and performance data of the same service type.

Step 103: Statistically analyze the basic data of cache servers of each category, to obtain evaluation indexes for the cache servers of each category.

In one implementation, after all the to-be-evaluated cache servers are classified into several categories, for the cache servers of each category, the evaluation device respectively collects the basic data for the cache servers of that category, analyzes the basic data after the data collection, to get various types of evaluation indexes for the cache servers of that category eventually.

Optionally, the process of collecting and analyzing the basic data of cache servers of each category to obtain the evaluation indexes for the cache servers of each category may be specifically as follows: for the cache servers of each category, obtaining the load data and the performance data for all cache servers under the current category; calculating the corresponding means, peak values, and distributions of the load data and the performance data as the evaluation indexes for the cache servers of the current category.

Here, the evaluation indexes include at least a load evaluation index and a performance evaluation index, where the performance evaluation index includes at least a disk capacity evaluation index and a disk load algorithm evaluation index.

In one implementation, the load evaluation index may be calculated according to the load data, while the disk capacity evaluation index and the disk load algorithm evaluation index may be calculated according to the performance data. Accordingly, after the classification of all the to-be-evaluated cache servers, the evaluation device selects cache servers of any category based on the result of the classification, pools together the previously obtained load data and performance data of all the cache servers under that category, and then calculates the corresponding mean, peak value, and distribution for each type of load data and the corresponding mean, peak value, and distribution for each type of performance data. The results obtained through the calculation are used as the evaluation indexes of the cache servers of that category. It is to be understood that according to actual needs, the evaluation device may perform the above processing on all the classified cache servers or on cache servers of a specified certain category.

For instance, for the IOPS-related load data, there are specific load data: IOPS_read and IOPS_write. Based on the IOPS_read and IOPS_write of each cache server under each category, the mean and peak value of the IOPS_read and the IOPS_write (i.e., the mean $avg_{IOPS\_r}$, the peak value $max_{IOPS\_r}$, the mean $avg_{IOPS\_w}$, the peak value $max_{IOPS\_w}$) of all the cache servers in the corresponding category may be calculated. The above means and the peak values of IOPS_read and IOPS_write are then used as the load evaluation index for the cache servers of each category.

For the IO delay-related performance data, there are specific performance data: IO delay and IO usage. Based on the IO delay of each cache server under each category, the mean and peak value of the IO delays (i.e., the mean $avg_{iowait}$, the peak value $max_{iowait}$) of all the cache servers of the corresponding category may be calculated. According to the IO delay of a cache server, the IO usage (high, medium, or low) of the cache server may be determined. Through the IO usage of each cache server under each category, the IO usage distribution of all cache servers in the corresponding category (i.e., the proportion of cache servers with a low IO usage ($X_{iowait}<5$), the proportion of cache servers with a medium IO usage ($5<X_{iowait}<15$), the proportion of cache servers with a high IO usage ($X_{iowait}\geq 15$)) may be calculated. The mean and the peak value of the IO delays and the IO usage distribution are then used as the disk capacity evaluation index for the cache servers of each category.

For the disk load-related performance data, there are specific performance data: disk load, disk usage, and multi-disk balancing degree. Through the disk load of each disk in each cache server under each category, the mean and peak value of the disk loads of all the cache servers in the corresponding category (i.e., the mean $avg_{util}$, the peak value $max_{util}$) may be calculated. According to the disk load of each disk in a cache server, the disk usage (high, medium, or low) of the cache server may be determined. Based on the disk usage of each cache server under each category, the disk usage distribution of all cache servers in the corresponding category (i.e., the proportion of cache servers with a low disk usage ($X_{util}$<25%), the proportion of cache servers with a medium disk usage (25%≤$X_{util}$<50%), and the proportion of cache servers with a high disk usage ($X_{util}$≥50%)) may be calculated. For a cache server with multiple disks, the disk load standard deviation between the multiple disks in the cache server may be calculated according to the disk load of each disk in the cache server. Based on the disk load standard deviation, the multi-disk balancing degree (high, medium, or low) of a cache server may be determined. Through the multi-disk balancing degree of each cache server under each category, the multi-disk balancing degree distribution of all cache servers in the corresponding category (i.e., the proportion of cache servers with a low multi-disk balancing degree ($X_{util}$<5%), the proportion of cache servers with a medium multi-disk balancing degree (5%≤$X_{util}$<10%), and the proportion of cache servers with a high multi-disk balancing degree ($X_{util}$≥10%)) may be calculated. The mean and the peak value of the disk usage, the disk usage distribution, and the multi-disk balancing degree distribution may be then used as the disk capacity evaluation index for the cache servers of each category.

The specific types of load evaluation index and performance evaluation index may refer to Table 1. It is to be noted that, in general, if one type of load evaluation index is high, the other types of load evaluation indexes may also be high; and if one type of load evaluation index is low, the other types of load evaluation indexes will also be low. The relationship between various types of performance evaluation indexes is similar. Accordingly, in real applications, every type of load evaluation index and performance evaluation index shown in Table 1 may be obtained, or only certain types of load evaluation index and performance evaluation index may be obtained.

TABLE 1

Evaluation Index Table

| Load (Performance) Data | | Evaluation Index |
|---|---|---|
| IOPS | IPOS_read | $avg_{IOPS\_r}$ |
| | | $max_{IOPS\_r}$ |
| | IOPS_write | $avg_{IOPS\_w}$ |
| | | $max_{IOPS\_w}$ |
| IO Throughput | IO Throughput_read | $avg_{kb/s\_r}$ |
| | | $max_{kb/s\_r}$ |
| | IO Throughput_write | $avg_{kb/s\_w}$ |
| | | $max_{kb/s\_w}$ |
| IO Queue Length | IO Queue | $avg_{avgqu-sz}$ |
| | | $max_{avgqu-sz}$ |
| IO Delay | IO Delay | $avg_{iowait}$ |
| | | $max_{iowait}$ |
| | IO Usage | proportion of cache servers with a low IO usage ($X_{iowait}$ < 5) |
| | | proportion of cache servers with a medium IO usage (5 < $X_{iowait}$ < 15) |
| | | proportion of cache servers with a high IO usage ($X_{iowait}$ ≥ 15) |
| Disk Load | Disk Load | $avg_{util}$ |
| | | $max_{util}$ |

TABLE 1-continued

Evaluation Index Table

| Load (Performance) Data | | Evaluation Index |
|---|---|---|
| | Disk Usage | proportion of cache servers with a low disk usage ($X_{util}$ < 25%) |
| | | proportion of cache servers with a medium disk usage (25% ≤ $X_{util}$ < 50%) |
| | | proportion of cache servers with a high disk usage ($X_{util}$ ≥ 50%) |
| | Multi-disk Balancing Degree | proportion of cache servers with a low multi-disk balancing degree ($X_{util}$ < 5%) |
| | | proportion of cache servers with a medium multi-disk balancing degree (5% ≤ $X_{util}$ < 10%) |
| | | proportion of cache servers with a high multi-disk balancing degree ($X_{util}$ ≥ 10%) |
| IO Waiting Time | IO Waiting Time | $avg_{await}$ |
| | | $max_{await}$ |

In one embodiment, a specific method for calculating the above-described peak values includes: pooling together the same type of load data or performance data of all cache servers under the current category, sorting the corresponding cache servers according to the numerical values from large to small, and determining a range for the number of cache servers used for data selection. In general, the number of cache servers used for data selection may account for 10% of the total number of all cache servers under the current category. After determining the specific number of cache servers for data selection, starting from the cache server corresponding to the largest value, the number of cache servers in the current category are sequentially selected according to the above-described order. The corresponding load data or performance data for these cache servers may be summed to obtain the total number, which is then divided by the number of cache servers used for data selection.

$$\max = \frac{\sum_{i=1}^{m} x_i}{m} \quad (1)$$

where max is the peak value for a type of evaluation index; $x_i$ is the load data or performance data, corresponding to that type of evaluation index, of the i-th cache server participating in the calculation under the current category; m is the number of cache servers participating in the calculation under the current category, where m=n×w %, n is the number of all cache servers under the current category, and w % is the proportion of cache servers of the current category, among all the cache servers of the current category, participating in the calculation.

For instance, to calculate the peak value $max_{IOPS\_r}$, of the IPOS_read in the load evaluation index for the cache servers of the current category, there are totally 10 cache servers under the current category, and the IOPS_r for each cache server in the load data is shown in Table 2. According to the order of numerical value from large to small, the cache servers are ranked as: x5>x10>x8>x7>x4>x9>x1>x6>x3>x2. Set the range of the number of cache servers used for data selection as 30% of the total number of all cache servers under the current category, then the specific number of cache servers used for data selection is 3 (10×30%=3). Accordingly, starting from x5, three cache servers x5, x10, and x8 are sequentially selected. The IOPS_r data corresponding to the three cache servers are summed to get a total number of 56, which is then divided by the number of cache servers used for the data selection, 3, to get a value of 18.7. That is, $\max_{IOPS\_r}=(22+18+16)/3=56/3=18.7$.

TABLE 2

IOPS_r Data

| s/n | $x_1$ | $x_2$ | $x_3$ | $x_4$ | $x_5$ | $x_6$ | $x_7$ | $x_8$ | $x_9$ | $x_{10}$ |
|---|---|---|---|---|---|---|---|---|---|---|
| IOPS_r | 10 | 2 | 5 | 13 | 22 | 7 | 14 | 16 | 11 | 18 |

In one embodiment, a specific method for calculating the above-described means includes: pooling together and summing the same type of load data or performance data of all cache servers under the current category, and dividing the obtained total number by the number of all cache servers under the current category. For details, refer to formula (2):

$$avg = \frac{\sum_{i=1}^{n} x_i}{n} \quad (3)$$

where avg is the mean of one type of evaluation index; $x_i$ is the load data or performance data, corresponding to that type of evaluation index, of the i-th cache server under the current category; n is the number of all cache servers under the current category.

Step 104: Determine disk IO configuration requirements for the cache servers of each category according to the evaluation indexes for the cache servers of each category.

Here, the disk IO configuration requirements include at least a disk capacity configuration requirement and a disk load algorithm configuration requirement.

In one implementation, after obtaining the evaluation indexes for the cache servers of each category, the evaluation device determines the disk IO configuration requirements, including the disk capacity configuration requirement and the disk load algorithm configuration requirement, of the cache servers of each category according to the specific evaluation indexes.

Optionally, the process of determining the disk IO configuration requirements for the cache servers of each category according to the evaluation indexes for the cache servers of each category may be specifically as follows: determining the disk capacity configuration requirement for cache servers of a current category according to the load evaluation index and the disk capacity evaluation index; and determining the disk load algorithm configuration requirement for the cache servers of the current category according to the disk load algorithm evaluation index.

Here, the disk capacity configuration requirement includes at least: capacity to-be-expanded, capacity to-be-reduced, and no capacity change; and the disk load algorithm configuration requirement includes at least: adjusting the algorithm and maintaining the algorithm.

In one implementation, after the evaluation device obtains, through the statistical analysis, each type of load evaluation index and performance evaluation index for the cache servers under the current category, since the load data of a cache server may be adjusted by changing the disk capacity, the load evaluation index and the disk capacity evaluation index may be used together to determine whether the disk capacity configuration requirement for the cache servers of the current category is "capacity to-be-expanded", "capacity to-be-reduced", or "no capacity change". The standard deviation of the disk load between multiple disks on a same cache server (i.e., the multi-disk balancing degree) may explain whether the load balancing algorithm between the multiple disks on the cache server is reasonable. Accordingly, through the disk load algorithm evaluation index, the proportions of each kind of multi-disk balancing degree (high, medium, low, see Table 1 for details) among all the cache servers of the current category may be determined, so that it may be determined whether the disk load algorithm configuration requirement for the cache servers of the current category is "adjusting the algorithm" or "maintaining the algorithm".

Optionally, through the load status of a cache server, it may be determined whether the disk capacity of the cache server meets the current service requirement, while the disk capacity evaluation index may further determine whether certain disk capacity of the cache server is wasted. Accordingly, the process of determining the disk capacity configuration requirement for the cache servers of the current category according to the load evaluation index and the disk capacity evaluation index may be specifically as follows: determining a load characteristic of the cache servers of the current category according to the load evaluation index, and determining a disk capacity characteristic of the cache servers of the current category according to the disk capacity evaluation index; if the load characteristic is "saturated", determining that the disk capacity configuration requirement for the cache servers of the current category is "capacity to-be-expanded"; if the load characteristic is "unsaturated" and the disk capacity characteristic is "excessive", determining that the disk capacity configuration requirement for the cache servers of the current category is "capacity to-be-reduced"; and if the load characteristic is "unsaturated" and the disk capacity characteristic is "not excessive", determining that the disk capacity configuration requirement for the cache servers of the current category is "no capacity change".

In one implementation, when determining the disk capacity configuration requirement for the cache servers of the current category, the evaluation device may first determine the load characteristic of the cache servers of the current category through the load evaluation index. The load characteristic may be generally expressed as "saturated" (greater than or equal to the load upper limit) or "unsaturated" (less than the load upper limit). If the load characteristic is "saturated", then the disk capacity characteristic of the cache servers of the current category is usually insufficient. Accordingly, there is no need to evaluate the disk capacity characteristic at this moment, and the disk capacity configuration requirement for the cache servers of the current category may be directly determined as "capacity to-be-expanded". If the load characteristic is "unsaturated", the disk capacity characteristic of the cache servers of the current category may be either "excessive" or "not excessive". Accordingly, there is a need to further determine, through the disk capacity evaluation index, which condition the disk capacity characteristic of the cache servers of the current category belongs to. If the disk capacity characteristic is "excessive", it may be determined that the disk capacity configuration requirement for the cache servers of the current category is "capacity to-be-reduced". If the disk capacity characteristic is "not excessive", it may be then determined that the disk capacity configuration requirement for the cache servers of the current category is "no capacity change".

Optionally, the process of determining the disk load algorithm configuration requirement for the cache servers of the current category according to the disk load algorithm evaluation index may be specifically as follows: determining, according to the disk load algorithm evaluation index, the proportion of cache servers, among all the cache servers of the current category, whose multi-disk balancing degrees are at a low level; if the proportion of cache servers whose multi-disk balancing degrees are at a low level is less than or equal to a threshold, determining that the disk load algorithm configuration requirement for the cache servers of the current category is "maintaining the algorithm"; and if the proportion of cache servers whose multi-disk balancing degrees are at a low level is greater than the threshold, determining that the disk load algorithm configuration requirement for the cache servers of the current category is "adjusting the algorithm".

In one implementation, after the evaluation device obtains the disk load algorithm evaluation index, since the high multi-disk balancing degree (at a high level) and the medium multi-disk balancing degree (at a medium level) both indicate that the load on the multiple disks is balanced, and thus there is no need to adjust the disk load algorithm. Accordingly, there is only a need to determine the proportion of cache servers with a low multi-disk balancing degree (i.e., at a low level), and then determine whether the proportion is less than or equal to a preset threshold. If the proportion of cache servers with a low multi-disk balancing degree is less than or equal to the threshold, it means that most of the cache servers of the current category have a high or medium multi-disk balancing degree, and the load on multiple disks is balanced for most of the cache servers. Accordingly, for all the cache servers of the current category as a whole, there is no need to adjust the disk load algorithm. Therefore, the disk load algorithm configuration requirement for the cache servers of the current category is determined to be "maintaining the algorithm". If the proportion of cache servers with a low multi-disk balancing degree is greater than the threshold, it means that most of the cache servers of the current category have a low multi-disk balancing degree, and the load on multiple disks is not balanced for most of the cache servers. Accordingly, for all the cache servers of the current category as a whole, there is a need to adjust the disk load algorithm. Therefore, the disk load algorithm configuration requirement for the cache servers of the current category is determined to be "adjusting the algorithm".

The foregoing content is illustrated by way of example of one evaluation cycle. The present disclosure may also determine the changing trends for the evaluation indexes of the cache servers of each category through multiple evaluation cycles to further determine the disk IO configuration requirements for the cache servers of each category. For instance, take one day as an evaluation cycle. After the evaluation indexes for the cache servers of a certain category are obtained for 10 consecutive days, a same type of evaluation index for the cache servers of that category within 10 days is compared, to determine whether the changing trend for that evaluation index is rising, falling, or remaining stable. Then, according to the changing trends of all the evaluation indexes for the cache servers of the category, the disk IO configuration requirements for the cache servers of that category may be determined.

In the embodiments of the present disclosure, basic data of all to-be-evaluated cache servers are collected, where the basic data includes at least service data, disk configuration, load data, and performance data; the basic data is filtered, and cache servers whose basic data have the same data characteristics are classified into one category; the basic data of cache servers of each category is statistically analyzed, to obtain evaluation indexes for the cache servers of each category; according to the evaluation indexes for the cache servers of each category, the disk IO configuration requirements for the cache servers of each category are determined, where the disk IO configuration requirements include at least a disk capacity configuration requirement and a disk load algorithm configuration requirement. In this way, cache servers with the same data characteristics are classified into one category, and all cache servers that have the same type of CDN services with the similar load characteristics and performance characteristics may be evaluated as a whole. Without direct use of the basic data for evaluation, the impact of abnormal data on the evaluation result during the evaluation process may be reduced, which may not only improve the accuracy of the evaluation result, but also allow the evaluation to be conducted for different CDN services.

Figure 2:
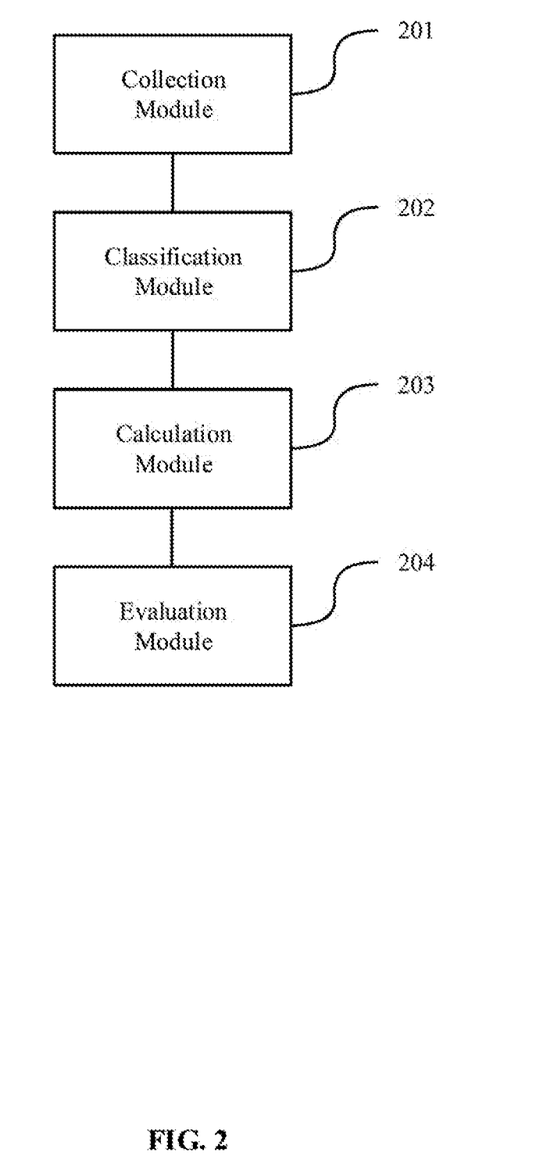
FIG. 2 is a schematic structural diagram of a device for evaluating IO performance of cache servers according to some embodiments of the present disclosure.

Based on the similar technical concept, the embodiments of the present disclosure further provide a device for evaluating IO performance of cache servers. As shown in FIG. 2, the device includes:

a collection module 201 that is configured to collect basic data of all to-be-evaluated cache servers, where the basic data includes at least service data, disk configuration, load data, and performance data;

a classification module 202 that is configured to filter the basic data of all the to-be-evaluated cache servers, and classify cache servers whose basic data have the same data characteristics into one category;

a calculation module 203 that is configured to statistically analyze basic data of cache servers of each category, to obtain evaluation indexes for the cache servers of each category; and an evaluation module 204 that is configured to determine, according to the evaluation indexes for the cache servers of each category, disk IO configuration requirements for the cache servers of each category, where the disk IO configuration requirements include at least a disk capacity configuration requirement and a disk load algorithm configuration requirement.

Optionally, the collection module 201 is specifically configured to:

acquire disk configuration and service data of each cache server from all the to-be-evaluated cache servers;

determine, according to the service data, a moment with the heaviest traffic, for a cache server, corresponding to the service data; and determine load data and performance data of the cache server for the moment with the heaviest traffic.

Optionally, the classification module 202 is specifically configured to:

determine, according to the service data, a service traffic range, an evaluation time range, and a corresponding service type for each to-be-evaluated cache server; and classify all the to-be-evaluated cache servers based on the service traffic range, the evaluation time range, the service type, and disk configuration of each to-be-evaluated cache server.

Optionally, the calculation module 203 is specifically configured to:

for the cache servers of each category, acquire load data and performance data of all cache servers under a current category; and calculate corresponding means, peak values, and distributions of the load data and the performance data as evaluation indexes for the cache servers of the current category, where the evaluation indexes include at least a load evaluation index and a performance evaluation index, and the performance evaluation index includes at least a disk capacity evaluation index and a disk load algorithm evaluation index.

Optionally, the evaluation module 204 is specifically configured to:

determine, according to the load evaluation index and the disk capacity evaluation index, the disk capacity configuration requirement for the cache servers of the current category, where the disk capacity configuration requirement includes at least: capacity to-be-expanded, capacity to-be-reduced, and no capacity change; and determine, according to the disk load algorithm evaluation index, the disk load algorithm configuration requirement for the cache servers of the current category, where the disk load algorithm configuration requirement includes at least: adjusting an algorithm and maintaining the algorithm.

Optionally, the evaluation module 204 is specifically configured to:

determine, according to the load evaluation index, a load characteristic of the cache servers of the current category, and determine, according to the disk capacity evaluation index, a disk capacity characteristic of the cache servers of the current category;

if the load characteristic is: saturated, determine that the disk capacity configuration requirement for the cache servers of the current category is: capacity to-be-expanded;

if the load characteristic is: unsaturated and the disk capacity characteristic is: excessive, determine that the disk capacity configuration requirement for the cache servers of the current category is: capacity to-be-reduced; and if the load characteristic is: unsaturated and the disk capacity characteristic is: not excessive, determine that the disk capacity configuration requirement for the cache servers of the current category is: no capacity change.

Optionally, the evaluation module 204 is specifically configured to:

determine, according to the disk load algorithm evaluation index, a proportion of cache servers, among all the cache servers under the current category, whose multi-disk balancing degrees are at a low level;

if the proportion of cache servers, whose multi-disk balancing degrees are at a low level, is less than or equal to a threshold, determine that the disk load algorithm configuration requirement for the cache servers of the current category is: maintaining the algorithm; and if the proportion of cache servers, whose multi-disk balancing degrees are at a low level, is greater than the threshold, determine that the disk load algorithm configuration requirement for the cache servers of the current category is: adjusting the algorithm.

Through the foregoing description of the embodiments, it is clear to those skilled in the art that each embodiment may be implemented by means of software plus a necessary general hardware platform, and apparently, by means of hardware as well. Based on this understanding, the technical solutions, or essentially the parts that contribute to the existing technologies, may be embodied in the form of a software product. The computer software product may be stored in a computer-readable storage medium, such as a ROM/RAM, a magnetic disc, an optical disc, etc., and include a series of instructions that cause a computing device (which may be a personal computer, a server, or a network device, etc.) to implement each embodiment or methods described in certain parts of each embodiment.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for evaluating IO performance of cache servers, comprising:
   collecting basic data of all to-be-evaluated cache servers, wherein the basic data includes at least service data, disk configuration, load data, and performance data;
   filtering the basic data of all the to-be-evaluated cache servers, and classifying cache servers whose basic data have the same data characteristics into one category;
   statistically analyzing basic data of cache servers of each category, to obtain evaluation indexes for the cache servers of each category; and
   determining, according to the evaluation indexes for the cache servers of each category, disk IO configuration requirements for the cache servers of each category, wherein the disk IO configuration requirements include at least a disk capacity configuration requirement and a disk load algorithm configuration requirement.

2. The method according to claim 1, wherein collecting the basic data of all the to-be-evaluated cache servers further includes:
   acquiring disk configuration and service data of each cache server from all the to-be-evaluated cache servers;
   determining, according to the service data, a moment with the heaviest traffic, for a cache server, corresponding to the service data; and
   determining load data and performance data of the cache server for the moment with the heaviest traffic.

3. The method according to claim 1, wherein filtering the basic data of all the to-be-evaluated cache servers, and classifying cache servers whose basic data have the same data characteristics into one category further includes:
   determining, according to the service data, a service traffic range, an evaluation time range, and a corresponding service type for each to-be-evaluated cache server; and
   classifying all the to-be-evaluated cache servers based on the service traffic range, the evaluation time range, the service type, and disk configuration of each to-be-evaluated cache server.

4. The method according to claim 1, wherein statistically analyzing the basic data of cache servers of each category, to obtain the evaluation indexes for the cache servers of each category further includes:
   for the cache servers of each category, acquiring load data and performance data of all cache servers under a current category; and
   calculating corresponding means, peak values, and distributions of the load data and the performance data as evaluation indexes for the cache servers of the current category, wherein the evaluation indexes include at least a load evaluation index and a performance evaluation index, and the performance evaluation index includes at least a disk capacity evaluation index and a disk load algorithm evaluation index.

5. The method according to claim 4, wherein determining, according to the evaluation indexes for the cache servers of each category, the disk IO configuration requirements for the cache servers of each category further includes:

determining, according to the load evaluation index and the disk capacity evaluation index, the disk capacity configuration requirement for the cache servers of the current category, wherein the disk capacity configuration requirement includes at least: capacity to-be-expanded, capacity to-be-reduced, and no capacity change; and determining, according to the disk load algorithm evaluation index, the disk load algorithm configuration requirement for the cache servers of the current category, wherein the disk load algorithm configuration requirement includes at least: adjusting an algorithm and maintaining the algorithm.

6. The method according to claim 5, wherein determining, according to the load evaluation index and the disk capacity evaluation index, the disk capacity configuration requirement for the cache servers of the current category further includes:

determining, according to the load evaluation index, a load characteristic of the cache servers of the current category, and determining, according to the disk capacity evaluation index, a disk capacity characteristic of the cache servers of the current category;

if the load characteristic is: saturated, determining that the disk capacity configuration requirement for the cache servers of the current category is: capacity to-be-expanded;

if the load characteristic is: unsaturated and the disk capacity characteristic is: excessive, determining that the disk capacity configuration requirement for the cache servers of the current category is: capacity to-be-reduced; and if the load characteristic is: unsaturated and the disk capacity characteristic is: not excessive, determining that the disk capacity configuration requirement for the cache servers of the current category is: no capacity change.

7. The method according to claim 5, wherein determining, according to the disk load algorithm evaluation index, the disk load algorithm configuration requirement for the cache servers of the current category further includes:

determining, according to the disk load algorithm evaluation index, a proportion of cache servers, among all the cache servers under the current category, whose multi-disk balancing degrees are at a low level;

if the proportion of cache servers, whose multi-disk balancing degrees are at a low level, is less than or equal to a threshold, determining that the disk load algorithm configuration requirement for the cache servers of the current category is: maintaining the algorithm; and if the proportion of cache servers, whose multi-disk balancing degrees are at a low level, is greater than the threshold, determining that the disk load algorithm configuration requirement for the cache servers of the current category is: adjusting the algorithm.

8. A device for evaluating IO performance of cache servers, comprising:

a collection module that is configured to collect basic data of all to-be-evaluated cache servers, wherein the basic data includes at least service data, disk configuration, load data, and performance data;

a classification module that is configured to filter the basic data of all the to-be-evaluated cache servers, and classify cache servers whose basic data have the same data characteristics into one category;

a calculation module that is configured to statistically analyze basic data of cache servers of each category, to obtain evaluation indexes for the cache servers of each category; and an evaluation module that is configured to determine, according to the evaluation indexes for the cache servers of each category, disk IO configuration requirements for the cache servers of each category, wherein the disk IO configuration requirements include at least a disk capacity configuration requirement and a disk load algorithm configuration requirement.

9. The device according to claim 8, wherein the collection module is further configured to:

acquire disk configuration and service data of each cache server from all the to-be-evaluated cache servers;

determine, according to the service data, a moment with the heaviest traffic, for a cache server, corresponding to the service data; and determine load data and performance data of the cache server for the moment with the heaviest traffic.

10. The device according to claim 8, wherein the classification module is further configured to:

determine, according to the service data, a service traffic range, an evaluation time range, and a corresponding service type for each to-be-evaluated cache server; and classify all the to-be-evaluated cache servers based on the service traffic range, the evaluation time range, the service type, and disk configuration of each to-be-evaluated cache server.

11. The device according to claim 8, wherein the calculation module is further configured to:

for the cache servers of each category, acquire load data and performance data of all cache servers under a current category; and calculate corresponding means, peak values, and distributions of the load data and the performance data as evaluation indexes for the cache servers of the current category, wherein the evaluation indexes include at least a load evaluation index and a performance evaluation index, and the performance evaluation index includes at least a disk capacity evaluation index and a disk load algorithm evaluation index.

12. The device according to claim 11, wherein the evaluation module is further configured to:

determine, according to the load evaluation index and the disk capacity evaluation index, the disk capacity configuration requirement for the cache servers of the current category, wherein the disk capacity configuration requirement includes at least: capacity to-be-expanded, capacity to-be-reduced, and no capacity change; and determine, according to the disk load algorithm evaluation index, the disk load algorithm configuration requirement for the cache servers of the current category, wherein the disk load algorithm configuration requirement includes at least: adjusting an algorithm and maintaining the algorithm.

13. The device according to claim 12, wherein the evaluation module is further configured to:

determine, according to the load evaluation index, a load characteristic of the cache servers of the current category, and determine, according to the disk capacity evaluation index, a disk capacity characteristic of the cache servers of the current category;

if the load characteristic is: saturated, determine that the disk capacity configuration requirement for the cache servers of the current category is: capacity to-be-expanded;

if the load characteristic is: unsaturated and the disk capacity characteristic is: excessive, determine that the disk capacity configuration requirement for the cache servers of the current category is: capacity to-be-reduced; and if the load characteristic is: unsaturated and the disk capacity characteristic is: not excessive, determine that the disk capacity configuration requirement for the cache servers of the current category is: no capacity change.

14. The device according to claim 12, wherein the evaluation module is further configured to:

determine, according to the disk load algorithm evaluation index, a proportion of cache servers, among all the cache servers under the current category, whose multi-disk balancing degrees are at a low level;

if the proportion of cache servers, whose multi-disk balancing degrees are at a low level, is less than or equal to a threshold, determine that the disk load algorithm configuration requirement for the cache servers of the current category is: maintaining the algorithm; and if the proportion of cache servers, whose multi-disk balancing degrees are at a low level, is greater than the threshold, determine that the disk load algorithm configuration requirement for the cache servers of the current category is: adjusting the algorithm.

* * * * *